(12) United States Patent
Lin (10) Patent No.: US 7,444,723 B2
(45) Date of Patent: Nov. 4, 2008

(54) SAFETY HOOK

(75) Inventor: Yu-Wen Lin, Taipei (TW)

(73) Assignee: Usang Industrial Co., Ltd., Taipei (TW)

( * ) Notice: Subject to any disclaimer, the term of this patent is extended or adjusted under 35 U.S.C. 154(b) by 0 days.

(21) Appl. No.: 11/727,056

(22) Filed: Mar. 23, 2007

(65) Prior Publication Data

US 2008/0127465 A1    Jun. 5, 2008

(30) Foreign Application Priority Data

Dec. 4, 2006    (TW) .............................. 95221311 U (51) Int. Cl.
*F16B 45/02*    (2006.01)
(52) U.S. Cl. ..................................... 24/600.1
(58) Field of Classification Search ............... 24/599.5, 24/600.1; 294/82.2
See application file for complete search history.

(56) References Cited

U.S. PATENT DOCUMENTS

2007/0062014 A1*    3/2007    Casebolt .................... 24/600.1

FOREIGN PATENT DOCUMENTS

JP    09242740 A    *    9/1997

* cited by examiner

*Primary Examiner*—James R Brittain
(74) *Attorney, Agent, or Firm*—Harness, Dickey & Pierce, P.L.C.

(57) ABSTRACT

A safety hook includes: a hook body defining a hook mouth; a latch unit including a latch plate pivoted to the hook body so as to be rotatable between locked and unlocked positions, the latch plate having a blocking plate portion; a releasing unit including a releasing plate pivoted to the hook body, the releasing plate having a driving plate portion; and a safety lock unit including a bent safety plate disposed between the latch plate and the releasing plate, pivotable between restraining and releasing positions, and having a restraining end portion abutting against the blocking plate portion, and a driven end portion abutting against the driving plate portion.

5 Claims, 7 Drawing Sheets

SAFETY HOOK

CROSS-REFERENCE TO RELATED APPLICATION

This application claims priority of Taiwanese Application No. 095221311, filed on Dec. 4, 2006.

BACKGROUND OF THE INVENTION

1. Field of the Invention

The invention relates to a safety hook, more particularly to a safety hook with a safety lock unit.

2. Description of the Related Art

Figure 1:
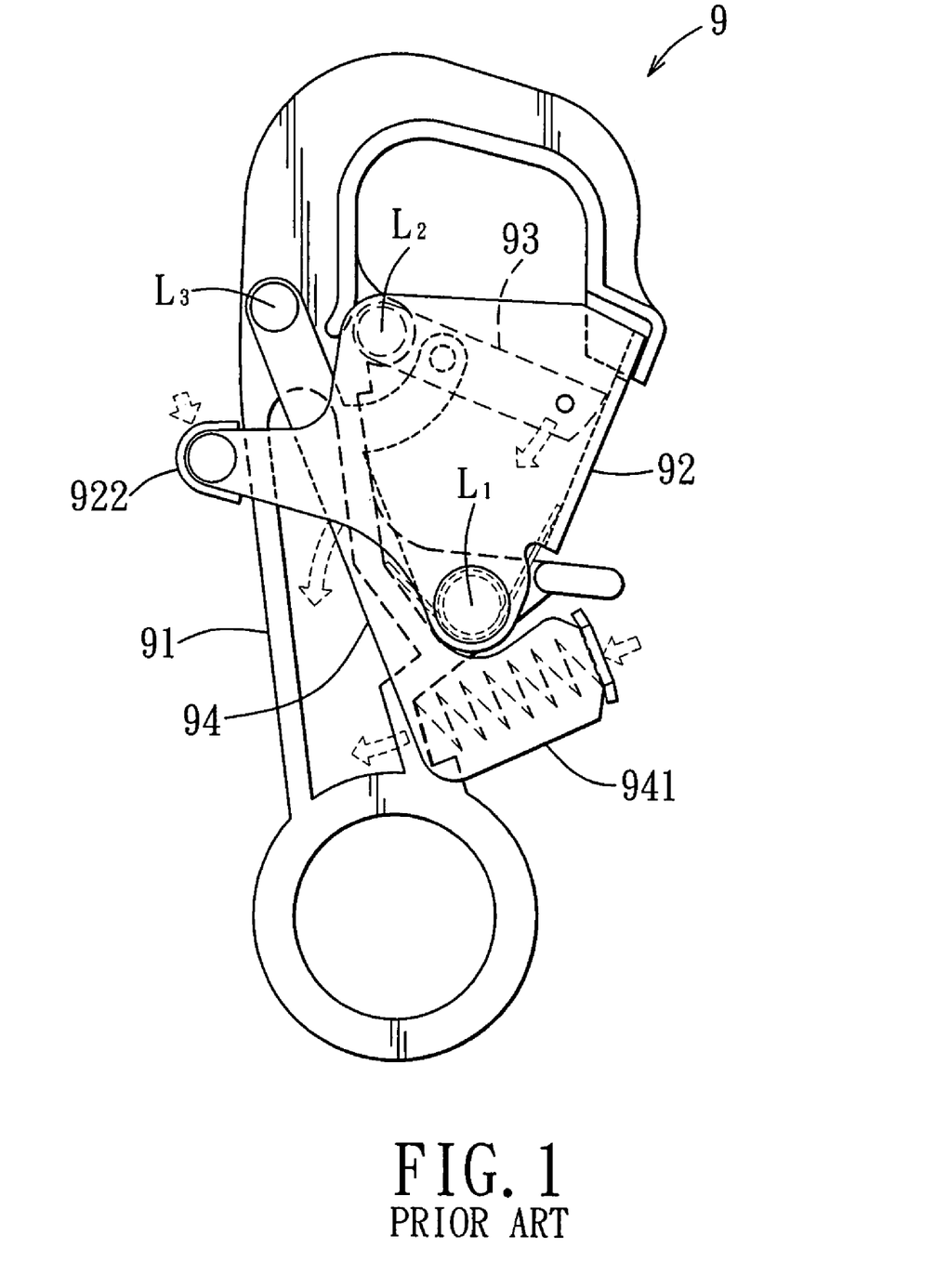
FIG. 1 is a schematic view of a conventional safety hook in a locked state.

FIG. 1 illustrates a conventional safety hook 9 that includes an inverted J-shaped hook body 91 that defines a hook mouth, a latch unit 92 pivoted to the hook body 91 about a first axis (L1) below the hook mouth for blocking and unblocking the hook mouth, a safety lock unit 93 pivoted to the hook body 91 about a second axis (L2) above the first axis (L1) for preventing undesired unblocking movement of the latch unit 92, and a releasing unit 94 that is pivoted to the hook body 91 about a third axis (L3) slightly above the second axis (L2) and that is pivotably connected to the safety lock unit 93. The releasing unit 94 has a spring-biased operating end portion 941 for releasing the latch unit 92 from a locked state.

When the latch unit 92 is to be unlocked, the operating end portion 941 of the releasing unit 94 is pushed to rotate the releasing unit 94 about the third pivot axis (L3), which results in rotation of the safety lock unit 93 about the second pivot axis (L2) in the same direction to a releasing position that permits unlocking of the latch unit 92. The latch unit 92 is formed with an operating protrusion 922 that is disposed opposite to the operating end portion 941 in order to permit the user to simultaneously press the operating end portion 941 of the releasing unit 94 and to move the latch unit 92 using one hand.

The conventional safety hook 9 is disadvantageous in that the releasing unit 94 has a relatively complicated structure. In addition, since the force applied to the operating protrusion 922 of the latch unit 92 is substantially perpendicular to the force applied to the operating end portion 941 of the releasing unit 94, unlocking operation of the latch unit 92 is relatively inconvenient.

SUMMARY OF THE INVENTION

Therefore, the object of the present invention is to provide a safety hook that can overcome the aforesaid drawbacks associated with the prior art.

Accordingly, a safety hook of this invention comprises: a hook body defining a hook inner space therein and a hook mouth in spatial communication with the hook inner space; a latch unit including a latch plate that is pivoted to the hook body so as to be rotatable relative to the hook body between locked and unlocked positions, the latch plate having a blocking plate portion that blocks the hook mouth when the latch unit is disposed at the locked position, thereby denying access into the hook inner space; a releasing unit including a releasing plate that is pivoted to the hook body so as to be rotatable relative to the hook body, the releasing plate having a driving plate portion opposite to the blocking plate portion of the latch plate; and a safety lock unit including a bent safety plate that is disposed between the latch plate and the releasing plate and that is pivoted to the hook body so as to be rotatable relative to the hook body between restraining and releasing positions. The bent safety plate has a pivoting middle portion pivoted to the hook body, a restraining end portion extending from one end of the pivoting middle portion to abut against the blocking plate portion of the latch plate, and a driven end portion extending from the other end of the pivoting middle portion to abut against the driving plate portion of the releasing plate so as to permit the bent safety plate to be driven by the releasing plate to rotate from the restraining position to the releasing position. The restraining end portion of the bent safety plate is perpendicular to the blocking plate portion of the latch plate when the bent safety plate is disposed at the restraining position, thereby preventing rotation of the latch plate from the locked position to the unlocked position. The restraining end portion of the bent safety plate is inclined to the blocking plate portion of the latch plate at an angle less than 90 degrees when the bent safety plate is disposed at the releasing position, thereby permitting rotation of the latch plate from the locked position to the unlocked position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail with reference to the accompanying preferred embodiments, it should be noted herein that like elements are denoted by the same reference numerals throughout the disclosure.

Figure 2:
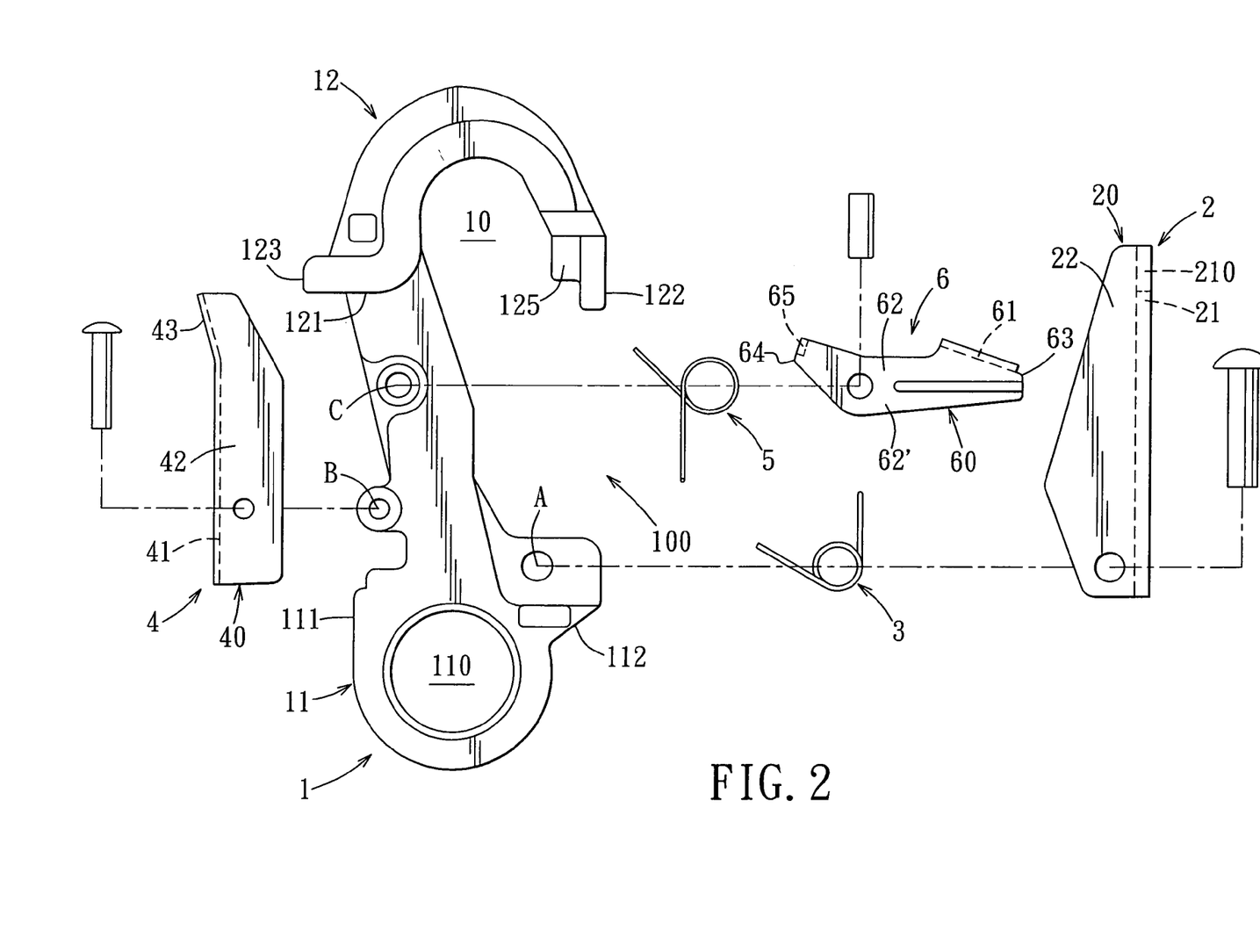
FIG. 2 is an exploded schematic view of the first preferred embodiment of a safety hook according to the present invention.
Figure 3:
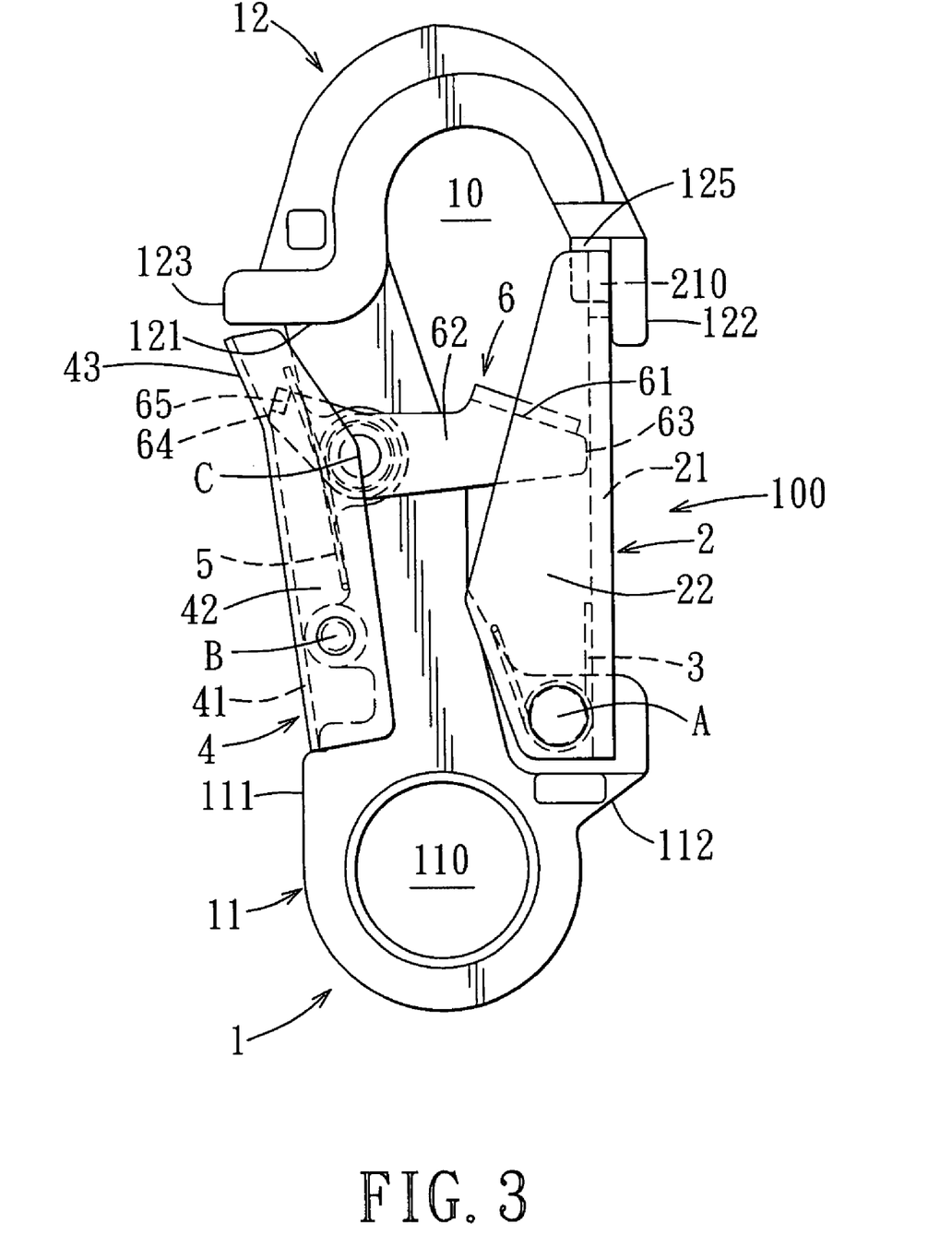
FIG. 3 is an assembled schematic view of the first preferred embodiment in a locked and restrained state.
Figure 4:
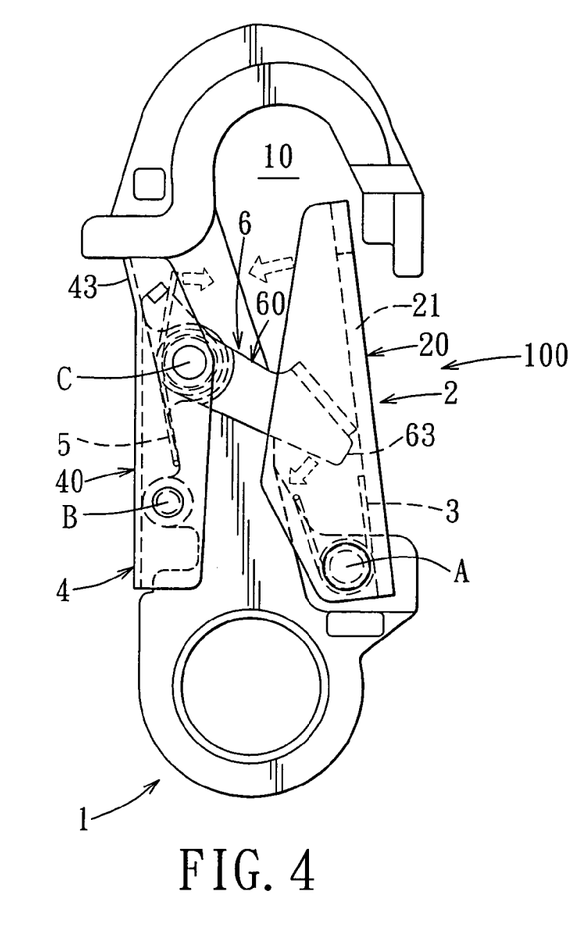
FIGS. 4 and 5 are schematic views to illustrate how a releasing unit is operated to release a latch unit from a safety lock unit of the first preferred embodiment.

Referring to FIGS. 2 and 3, the first preferred embodiment of a safety hook according to the present invention is shown to include: a hook body 1 defining a hook inner space 10 therein and a hook mouth 100 in spatial communication with the hook inner space 10; a latch unit 2 including a latch plate 20 that is pivoted to the hook body 1 so as to be rotatable relative to the hook body 1 between locked and unlocked positions (see FIGS. 3 and 5), the latch plate 20 having a blocking plate portion 21 that blocks the hook mouth 100 when the latch unit 2 is disposed at the locked position, thereby denying access into the hook inner space 10; a releasing unit 4 including a releasing plate 40 that is pivoted to the hook body 1 so as to be rotatable relative to the hook body 1, the releasing plate 40 having a driving plate portion 41 opposite to the blocking plate portion 21 of the latch plate 20; and a safety lock unit 6 including a bent safety plate 60 that is disposed between the latch plate 20 and the releasing plate 40 and that is pivoted to the hook body 1 so as to be rotatable relative to the hook body 1 between restraining and releasing positions (see FIGS. 3 and 4). The bent safety plate 60 has a pivoting middle portion 62 pivoted to the hook body 1, a restraining end portion 63 extending from one end of the pivoting middle portion 62 to abut against the blocking plate portion 21 of the latch plate 20, and a driven end portion 64 extending from the other end of the pivoting middle portion 62 to abut against the driving plate portion 41 of the releasing plate 40 so as to permit the bent safety plate 60 to be driven by the releasing plate 40 to rotate from the restraining position to the releasing position. The restraining end portion 63 of the bent safety plate 60 is perpendicular to the blocking plate portion 21 of the latch plate 20 when the bent safety plate 60 is disposed at the restraining position, thereby preventing rotation of the latch plate 20 from the locked position to the unlocked position. The restraining end portion 63 of the bent safety plate 60 is inclined to the blocking plate portion 21 of the latch plate 20 at an angle less than 90 degrees when the bent safety plate 60 is disposed at the releasing position, thereby permitting rotation of the latch plate 20 from the locked position to the unlocked position.

In this embodiment, the restraining end portion 63 of the bent safety plate 60 and the driven end portion 64 of the bent safety plate 60 form an angle less than 180 degrees and greater than 90 degrees.

Referring again to FIGS. 2 and 3, the hook body 1 has a base segment 11 with a front end 112, and a hook end segment 12 with a free end 122 that cooperates with the front end 112 of the base segment 11 to define the hook mouth 100. The latch plate 20 is pivoted to the front end 112 of said base segment 11. The latch unit 2 further includes a first urging member 3 that urges the blocking plate portion 21 of the latch plate 20 to abut against the free end 122 of the hook end segment 12 of the hook body 1.

The safety lock unit 6 further includes a second urging member 5 that urges the restraining end portion 63 of the bent safety plate 60 to abut against the blocking plate portion 21 of the latch plate 20.

In this preferred embodiment, the latch plate 20 is pivoted to the hook body 1 about a first axis (A), the releasing plate 40 is pivoted to the hook body 1 about a second axis (B), and the bent safety plate 60 is pivoted to the hook body 1 about a third axis (C) that is parallel to the first and second axes (A, B). The second axis (B) is disposed between the first and third axes (A, C).

The base segment 11 is formed with a through-hole 110 adapted for extension of a cord or the like (not shown) therethrough, and further has a rear end 111. The free end 122 of the hook segment is formed with a limiting protrusion 125. The blocking plate portion 21 of the latch plate 20 of the latch unit 2 is formed with a top notch 210 for extension of the limiting protrusion 125 therethrough when the latch unit 2 is disposed at the locked position. The latch plate 20 is generally U-shaped and further has a pair of wing portions 22 extending transversely and respectively from opposite lateral edges of the blocking plate portion 21 and straddled on the hook body 1. The latch unit 2 is pivoted to the hook body 1 through the wing portions 22.

The releasing plate 40 of the releasing unit 4 is generally U-shaped and further has a pair of wing portions 42 extending transversely and respectively from opposite lateral edges of the driving plate portion 41 and straddled on the hook body 1. The releasing unit 4 is pivoted to the hook body 1 through the wing portions 42. The second axis (B,) is disposed adjacent to the rear end 111 of the base segment 11. A protective flange 123 is formed on and protrudes outwardly from the hook end segment 12 so as to define a recess 121 thereat. The releasing plate 40 has a top end 43 that is bent outwardly and that has an outer edge which is disposed within the recess 121 defined by the protective flange 123 or which is flush with an outer edge of the flange 123 formed on the hook end segment 12 so as to prevent accidental movement of the releasing unit 4 from occurring when the latch unit 2 is to be retained at the locked position.

The bent safety plate 60 includes a connecting part 61 and a pair of wing parts 62' extending transversely and respectively from two ends of the connecting part 61 and straddled on the hook body 1. The wing parts 62' cooperatively define the pivoting middle portion 62, the restraining end portion 63, and the driven end portion 64 of the bent safety plate 60. A folded portion 65 is bent from one end of the driven end portion 64 of the bent safety plate 60. The safety lock unit 6 is pivoted to the hook body 1 through the wing parts 62'.

Figure 5:
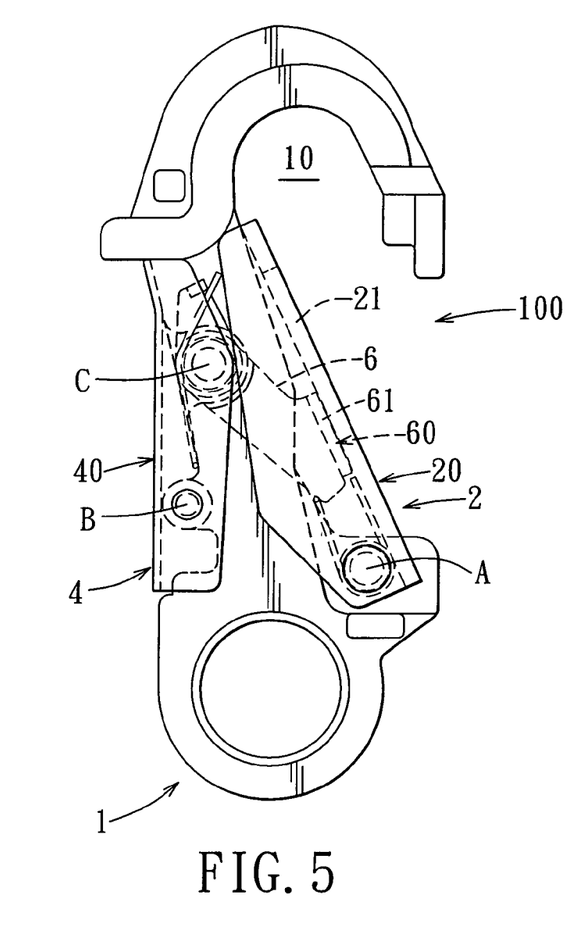

During unlocking operation of the safety hook, as shown in FIGS. 4 and 5, the top end 43 of the releasing plate 40 is pressed such that there leasing unit 4 is pivoted about the second axis (B) in a first direction to drive the bent safety plate 60 to rotate about the third axis (C) in the first direction. As such, the restraining end portion 63 of the bent safety plate 60 is no longer perpendicular to the blocking plate portion 21 of the latch plate 20, thereby permitting rotation of the latch plate 20. At this time, a force exerted in a second direction opposite to the first direction is subsequently applied to a top end of the latch plate 21 to rotate the latch plate 20 about the first axis (A) so as to open the hook mouth 100. The connecting part 61 abuts against the blocking plate portion 21 of the latch plate 20 when the hook mouth 100 is fully opened (see FIG. 5).

Figure 6:
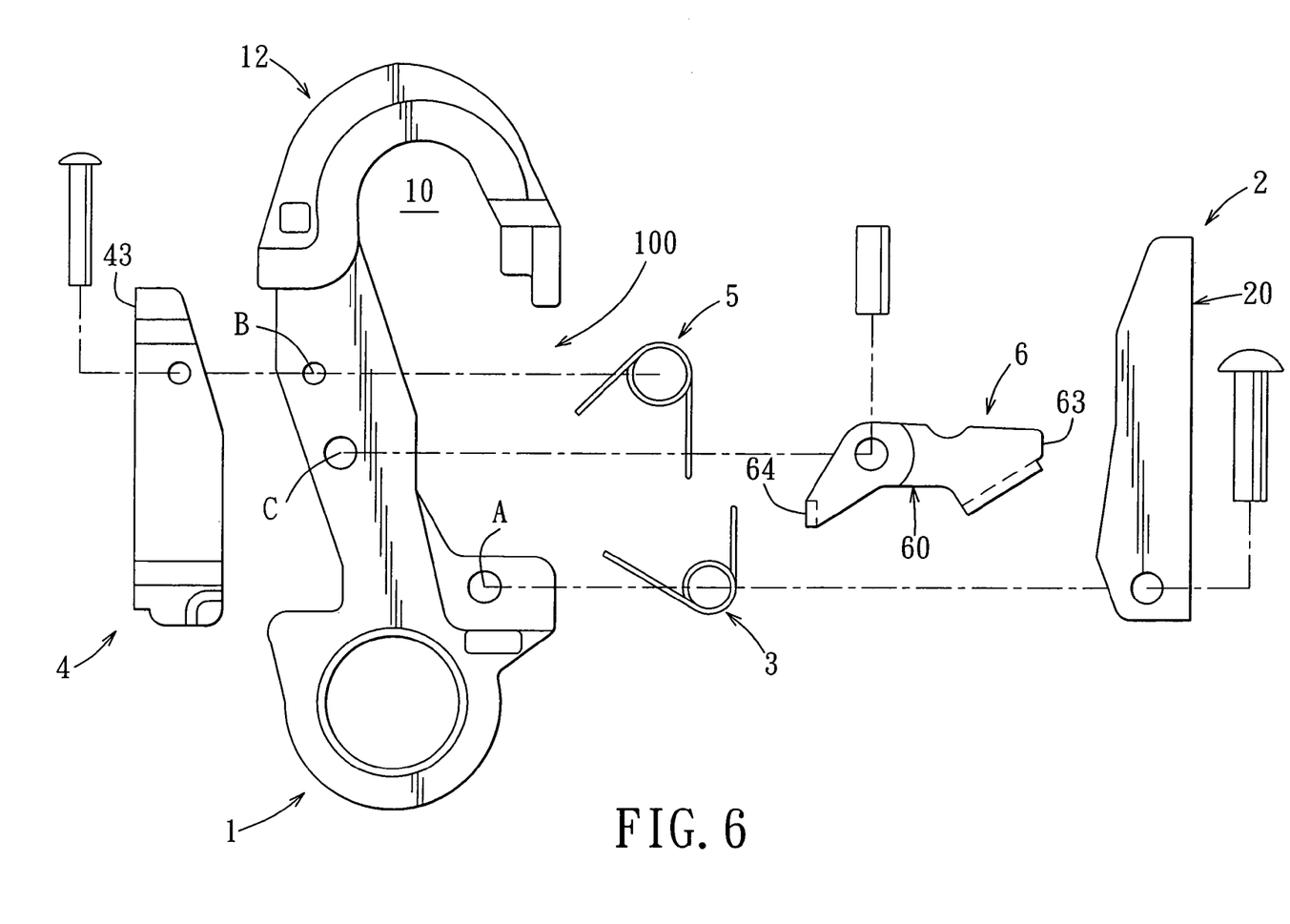
FIG. 6 is an exploded schematic view of the second preferred embodiment of a safety hook according to the present invention.
Figure 7:
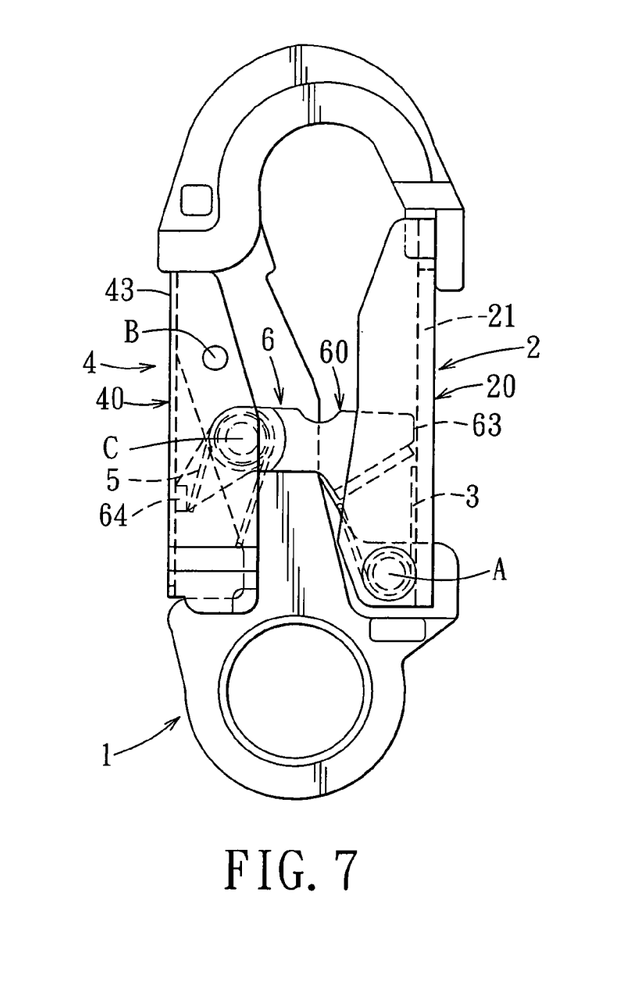
FIG. 7 is an assembled schematic view of the second preferred embodiment in a locked and restrained state.
Figure 8:
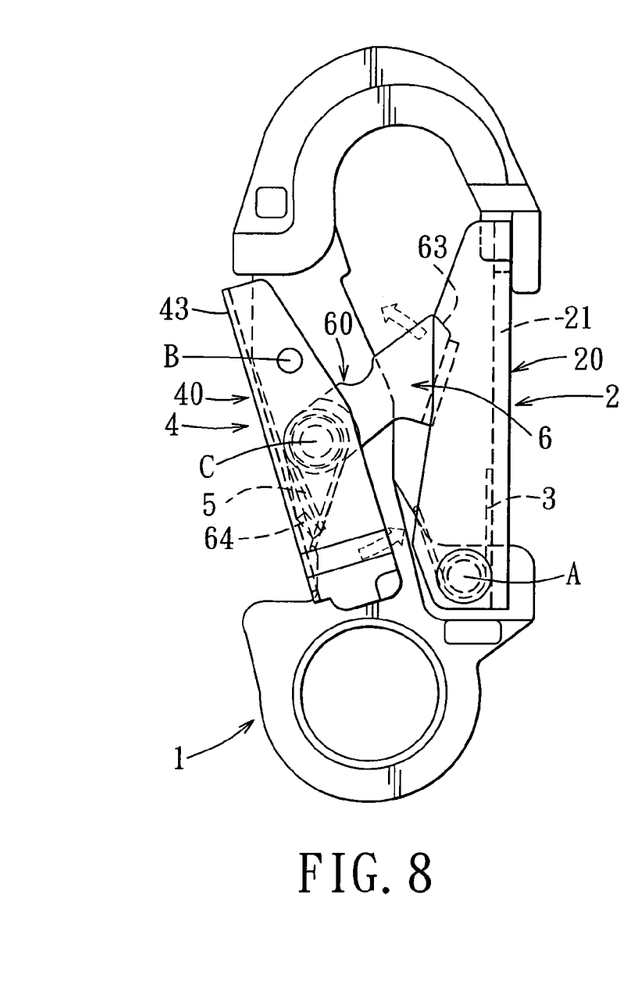
FIGS. 8 to 10 are schematic views to illustrate how a releasing unit is operated to release a latch unit from a safety lock unit of the second preferred embodiment.
Figure 9:
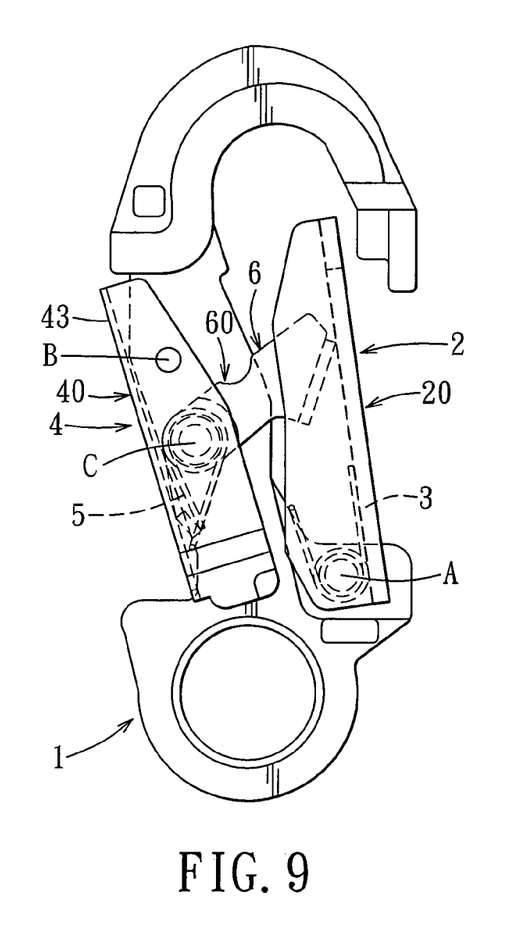
Figure 10:
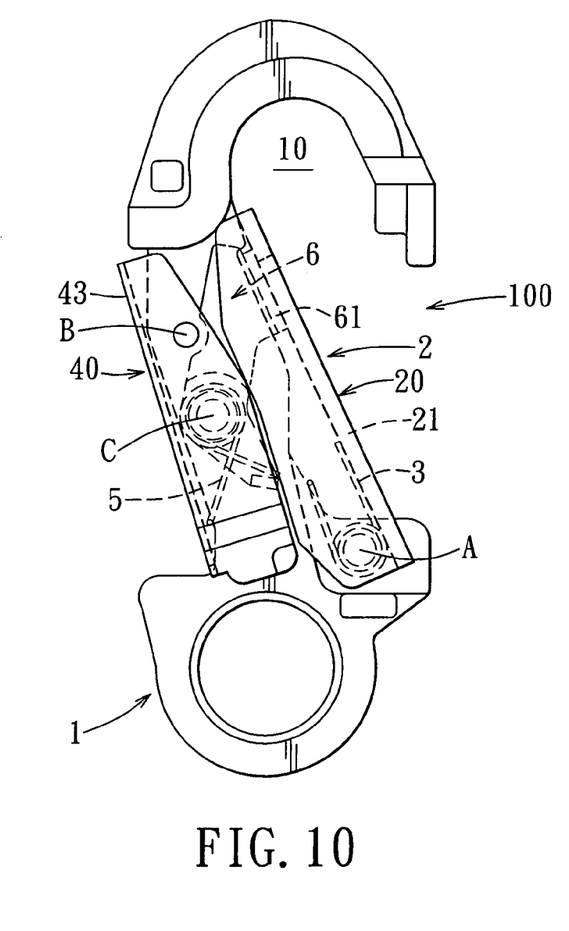

As shown in FIGS. 6 and 7, the second preferred embodiment of the safety hook according to this invention differs from the previous embodiment in that the third axis (C) is disposed between the first and second axes (A, B) and that the top end 43 of the releasing plate 40 is pivoted to the hook body 1. Hence, the pressing action is to be applied to a bottom end of the releasing plate 40 (see FIG. 8), and the rotating direction of the releasing plate 40 and the bent safety plate 60 of this preferred embodiment (see FIGS. 9 and 10) is opposite to that of the previous embodiment (see FIGS. 4 and 5) during unlocking operation of the latch unit 2.

With the inclusion of the bent safety plate 60 in the safety lock unit 6 of the safety hook of this invention, the aforesaid drawbacks associated with the conventional safety hook can be eliminated.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:
1. A safety hook comprising:
a hook body defining a hook inner space therein and a hook mouth in spatial communication with said hook inner space;
a latch unit including a latch plate that is pivoted to said hook body so as to be rotatable relative to said hook body between locked and unlocked positions, said latch plate having a blocking plate portion that blocks said hook mouth when said latch unit is disposed at the locked position, thereby denying access into said hook inner space;

a releasing unit including a releasing plate that is pivoted to said hook body so as to be rotatable relative to said hook body, said releasing plate having a driving plate portion opposite to said blocking plate portion of said latch plate; and a safety lock unit including a bent safety plate that is disposed between said latch plate and said releasing plate and that is pivoted to said hook body so as to be rotatable relative to said hook body between restraining and releasing positions, said bent safety plate having a pivoting middle portion pivoted to said hook body, a restraining end portion extending from one end of said pivoting middle portion to abut against said blocking plate portion of said latch plate, and a driven end portion extending from the other end of said pivoting middle portion to abut against said driving plate portion of said releasing plate so as to permit said bent safety plate to be driven by said releasing plate to rotate from the restraining position to the releasing position, said restraining end portion of said bent safety plate being perpendicular to said blocking plate portion of said latch plate when said bent safety plate is disposed at the restraining position, thereby preventing rotation of said latch plate from the locked position to the unlocked position, said restraining end portion of said bent safety plate being inclined to said blocking plate portion of said latch plate at an angle less than 90 degrees when said bent safety plate is disposed at the releasing position, thereby permitting rotation of said latch plate from the locked position to the unlocked position;

wherein said restraining end portion of said bent safety plate and said driven end portion of said bent safety plate form an angle less than 180 degrees and greater than 90 degrees.

2. The safety hook as claimed in claim 1, wherein said hook body has a base segment with a front end, and a hook end segment that cooperates with said front end of said base segment to define said hook mouth, said latch plate being pivoted to said front end of said base segment, said latch unit further including a first urging member that urges said blocking plate portion of said latch plate to abut against said hook end segment of said hook body.

3. The safety hook as claimed in claim 2, wherein said safety lock unit further includes a second urging member that urges said restraining end portion of said bent safety plate to abut against said blocking plate portion of said latch plate.

4. The safety hook as claimed in claim 1, wherein said latch plate is pivoted to said hook body about a first axis, said releasing plate being pivoted to said hook body about a second axis, said bent safety plate being pivoted to said hook body about a third axis that is parallel to said first and second axes, said second axis being disposed between said first and third axes.

5. A safety hook comprising:

a hook body defining a hook inner space therein and a hook mouth in spatial communication with said hook inner space;

a latch unit including a latch plate that is pivoted to said hook body so as to be rotatable relative to said hook body between locked and unlocked positions, said latch plate having a blocking plate portion that blocks said hook mouth when said latch unit is disposed at the locked position, thereby denying access into said hook inner space;

a releasing unit including a releasing plate that is pivoted to said hook body so as to be rotatable relative to said hook body, said releasing plate having a driving plate portion opposite to said blocking plate portion of said latch plate; and a safety lock unit including a bent safety plate that is disposed between said latch plate and said releasing plate and that is pivoted to said hook body so as to be rotatable relative to said hook body between restraining and releasing positions, said bent safety plate having a pivoting middle portion pivoted to said hook body, a restraining end portion extending from one end of said pivoting middle portion to abut against said blocking plate portion of said latch plate, and a driven end portion extending from the other end of said pivoting middle portion to abut against said driving plate portion of said releasing plate so as to permit said bent safety plate to be driven by said releasing plate to rotate from the restraining position to the releasing position, said restraining end portion of said bent safety plate being perpendicular to said blocking plate portion of said latch plate when said bent safety plate is disposed at the restraining position, thereby preventing rotation of said latch plate from the locked position to the unlocked position, said restraining end portion of said bent safety plate being inclined to said blocking plate portion of said latch plate at an angle less than 90 degrees when said bent safety plate is disposed at the releasing position. thereby permitting rotation of said latch plate from the locked position to the unlocked position;

wherein said latch plate is pivoted to said hook body about a first axis, said releasing plate being pivoted to said hook body about a second axis, said bent safety plate being pivoted to said hook body about a third axis that is parallel to and that is disposed between said first and second axes.

* * * * *